United States Patent
Deville et al.

(10) Patent No.: US 11,639,459 B2
(45) Date of Patent: May 2, 2023

(54) SYSTEM AND METHOD TO QUANTIFY FLUID ADDITIVES

(71) Applicant: HALLIBURTON ENERGY SERVICES, INC., Houston, TX (US)

(72) Inventors: Jay Paul Deville, Spring, TX (US); Preston Andrew May, Porter, TX (US); Michele Suzanne Brown, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/845,293

(22) Filed: Jun. 21, 2022

(65) Prior Publication Data

US 2022/0315824 A1 Oct. 6, 2022

Related U.S. Application Data

(62) Division of application No. 16/769,282, filed as application No. PCT/US2019/040124 on Jul. 1, 2019, now abandoned.

(51) Int. Cl.
*C09K 8/035* (2006.01)
(52) U.S. Cl.
CPC .................. *C09K 8/035* (2013.01)
(58) Field of Classification Search
None
See application file for complete search history.

(56) References Cited

U.S. PATENT DOCUMENTS

| | | | |
|---|---|---|---|
| 4,507,212 A | 3/1985 | Dria et al. | |
| 4,525,496 A | 6/1985 | Adaway et al. | |
| 10,351,754 B1* | 7/2019 | Reddy | C04B 28/02 |
| 2002/0043620 A1 | 4/2002 | Tchakarov et al. | |
| 2005/0049149 A1* | 3/2005 | Patel | C09K 8/24 |
| | | | 507/124 |
| 2005/0049150 A1* | 3/2005 | Patel | C09K 8/22 |
| | | | 507/136 |
| 2012/0000644 A1* | 1/2012 | Huang | E21B 33/06 |
| | | | 166/84.4 |
| 2013/0020083 A1 | 1/2013 | Wagie et al. | |
| 2016/0046854 A1 | 2/2016 | Gordon et al. | |
| 2017/0129982 A1* | 5/2017 | Huang | C08L 15/005 |
| 2017/0204718 A1 | 7/2017 | Pearl, Jr. et al. | |
| 2017/0335188 A1 | 11/2017 | Shi et al. | |

FOREIGN PATENT DOCUMENTS

| | | |
|---|---|---|
| JP | H05019949 U | 3/1993 |
| WO | 2018156123 A1 | 8/2018 |

OTHER PUBLICATIONS

International Search Report and Written Opinion; PCT Application No. PCT/US2019/040124; dated Apr. 1, 2020.
English Abstract of JPH0519919U retrieved from Google Patents on Jun. 1, 2020.

\* cited by examiner

*Primary Examiner* — Andrew Sue-Ako
(74) *Attorney, Agent, or Firm* — Polsinelli PC

(57) ABSTRACT

A fluid is provided. The fluid includes a base fluid and an additive. The additive has a marker functional group that absorbs infrared radiation having a wavelength in a predetermined range between about 2100 $cm^{-1}$ and about 2300 $cm^{-1}$.

9 Claims, 4 Drawing Sheets

500

502 Measure, by a sensor, absorption of infrared radiation by a fluid

504 Determine, by a controller a concentration of an additive in the fluid based on absorption of the infrared radiation by a marker control group of the additive having a wavelength in a predetermined range between about 2100$cm^{-1}$ and about 2300 $cm^{-1}$

SYSTEM AND METHOD TO QUANTIFY FLUID ADDITIVES

CROSS REFERENCE TO RELATED APPLICATIONS

This application is a divisional application of U.S. application Ser. No. 16/769,282 filed on Jun. 3, 2020, which is a national stage entry of PCT/US2019/040124 filed Jul. 1, 2019, each application being expressly incorporated herein by reference in its entirety.

FIELD

The present disclosure relates generally to systems and methods to quantify fluid additives. In at least one example, the present disclosure relates to systems and methods to determine the concentration of one or more additives based on absorption of infrared radiation.

BACKGROUND

In order to produce oil or gas, a well is drilled into a subterranean formation, which may contain a hydrocarbon reservoir or may be adjacent to a reservoir. Many drilling components may be utilized to drill a well such as drill collars, drill bits, and downhole tools. During drilling, many fluids are utilized. For example, drilling fluid may include a base fluid and one or more additives. Additionally, in other oil and gas processes, for example stimulation, fluids may include additives to achieve desired results.

BRIEF DESCRIPTION OF THE DRAWINGS

Implementations of the present technology will now be described, by way of example only, with reference to the attached figures, wherein.

DETAILED DESCRIPTION

Figure 1:
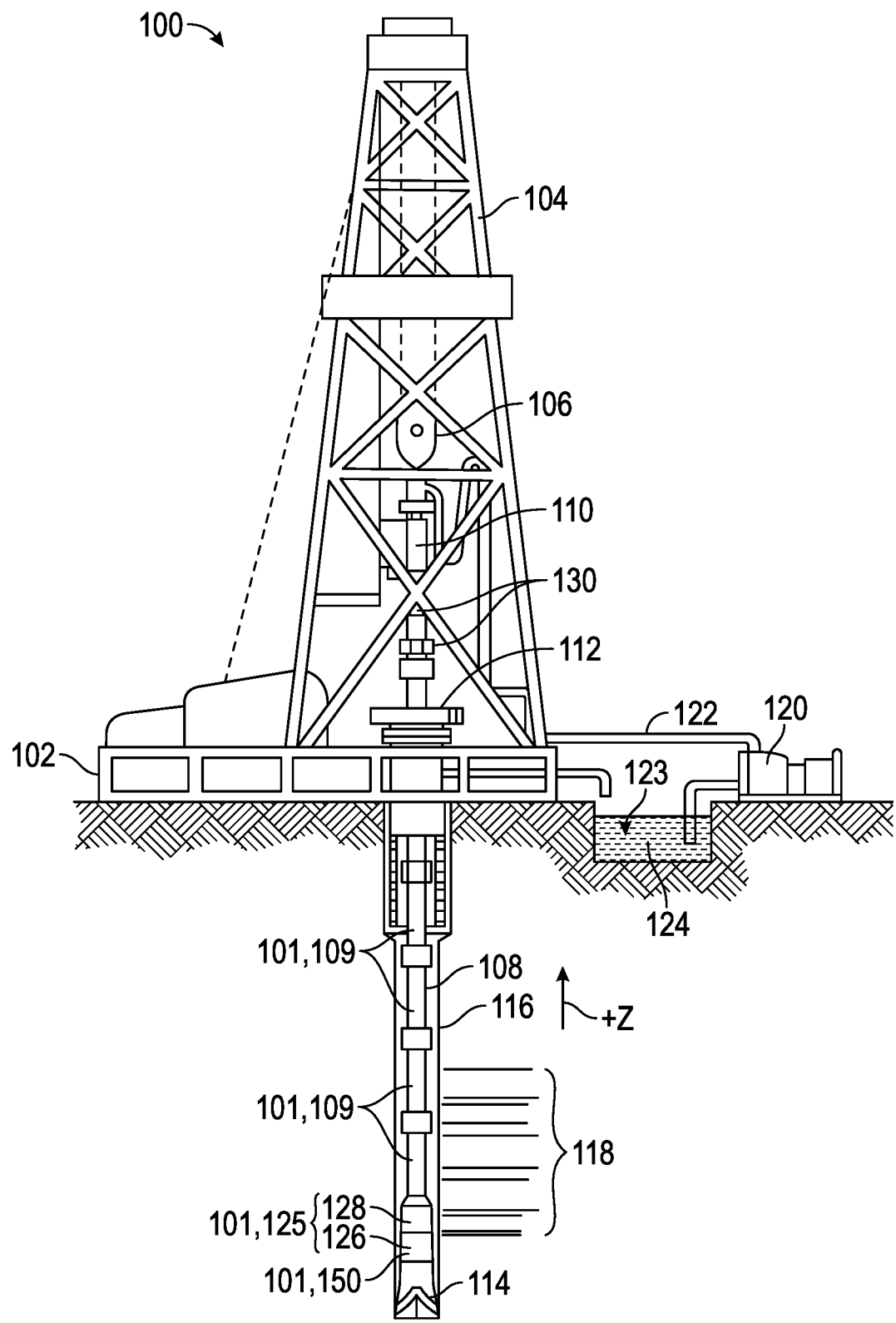
FIG. 1 is a diagram illustrating an example of an environment in which a system may be used in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein is a system and method to quantify additives in a fluid. The fluid includes a base fluid and an additive. The additive may be any compound added to the drilling fluid, and as disclosed herein, can be modified to include a marker functional group. The marker functional group may be one not typically a part of an additive or the wellbore environment, and so its presence can be used to indicate the presence of the main compound, and as a result, the additive.

The marker functional group may absorb infrared radiation having a wavelength in a predetermined range between about 2100 $cm^{-1}$ and about 2300 $cm^{-1}$. For example, the marker functional group can include a carbon to carbon triple bond. Infrared radiation having wavelengths in a predetermined range between about 2100 $cm^{-1}$ and about 2300 $cm^{-1}$ removes much of the environmental noise, especially in the oil and gas field. For example, low level total petroleum hydrocarbons absorb infrared radiation at 2950 $cm^{-1}$. The marker functional group may have a carbon to carbon or carbon to heteroatom triple bond, such as an alkyne or nitrile.

The additive may be any compound added to a drilling fluid. A particular additive includes shale encapsulators. Another example of an additive includes shale swelling inhibitors. Such additives may be vinyl polymers, and may be homopolymers or copolymers of acrylate and acrylamide. However, any compound or polymeric compound having a main hydrocarbon chain which can be modified to include the marker functional group herein may be suitable. In some examples, additives may be polyethylene glycol, polyethylene glycol polypropylene glycol copolymers, polyolefin polymers, and/or polysaccharides. In some examples, additives may be non-polymeric additives that contain the marker functional groups necessary to absorb infrared radiation in the predetermined range. For example, additives may be small molecule shale swelling inhibitors.

The main chain can be, for example, vinyl polymers with repeating units of a C1 to C10 alkane or a C1 to C10 alkene, which may have carboxylic acid, amide, alcohol, and/or ester substituents. These compounds and polymeric compounds can be modified with or copolymerized with the marker functional group disclosed herein. The presence and amount of the marker functional group can be measured to determine the corresponding presence and amount of the additive.

Conventionally, quantification tests may be difficult, laborious, slow, and/or sensitive to interferences to be effectively conducted at the rig site. Accordingly, use of the marker functional group as disclosed herein allow for quicker and easier quantification of the additives, allowing for assurance and/or adjustments such that adequate levels of the additives are present in the fluid.

The disclosure now turns to FIG. 1, which illustrates a diagrammatic view of an exemplary wellbore drilling environment 100, in which the present disclosure may be implemented. As illustrated in FIG. 1, a drilling platform 102 is equipped with a derrick 104 that supports a hoist 106 for raising and lowering one or more drilling components 101 which can include, for example, a drill string 108 which can include one or more drill collars 109, a drill bit 114, and/or a bottom-hole assembly 125. The drilling components 101 are operable to drill a wellbore 116. The drilling components 101 also can include housings for one or more downhole tools.

The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through one or more formations 118. A pump 120 circulates fluid 123, for example drilling fluid, through a supply pipe 122 to top drive 110, down through the interior of drill string 108, through orifices in drill bit 114, back to the surface via the annulus around drill string 108, and into a retention pit 124. The fluid 123 can transport cuttings from the wellbore 116 into the pit 124 and aids in maintaining the integrity of the wellbore 116. Various materials can be used for drilling fluid, including oil-based fluids and water-based fluids.

Figure 2:
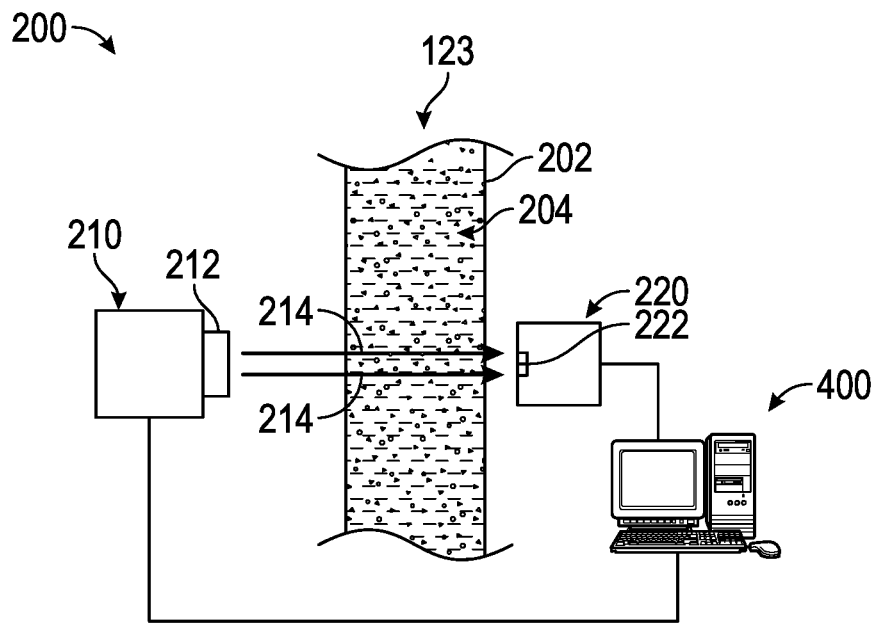
FIG. 2 is a diagram illustrating an exemplary sensor to quantify additives in a fluid.

As illustrated in FIG. 1, sensors 126 can be provided, for example integrated into the bottom-hole assembly 125 near the drill bit 114. For example, the sensors 126 can include a sensor 200 to quantify the amount of additives in a fluid, for example as illustrated in FIG. 2. As the drill bit 114 extends the wellbore 116 through the formations 118, the sensors 126 can collect measurements of various drilling parameters, for example relating to various formation properties, the orientation of the drilling component(s) 101, dog leg severity, pressure, temperature, weight on bit, torque on bit, and/or rotations per minute. The sensors 126 can be any suitable sensor to measure the drilling parameters, for example transducers, fiber optic sensors, and/or surface and/or downhole sensors. The bottom-hole assembly 125 may also include a telemetry sub 128 to transfer measurement data to a surface receiver 130 and to receive commands from the surface. In some examples, the telemetry sub 128 communicates with a surface receiver 130 using mud pulse telemetry. In other examples, the telemetry sub 128 does not communicate with the surface, but rather stores logging data for later retrieval at the surface when the logging assembly is recovered. Notably, one or more of the bottom-hole assembly 125, the sensors 126, and the telemetry sub 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface.

Each of the sensors 126 may include a plurality of tool components, spaced apart from each other, and communicatively coupled with one or more wires. The telemetry sub 128 may include wireless telemetry or logging capabilities, or both, such as to transmit information in real time indicative of actual downhole drilling parameters to operators on the surface.

The sensors 126, for example an acoustic logging tool, may also include one or more computing devices 150 communicatively coupled with one or more of the plurality of drilling components 101. The computing device 150 may be configured to control or monitor the performance of the sensors 126, process logging data, and/or carry out the methods of the present disclosure.

In some examples, one or more of the sensors 126 may communicate with a surface receiver 130, such as a wired drillpipe. In other cases, the one or more of the sensors 126 may communicate with a surface receiver 130 by wireless signal transmission. In at least some cases, one or more of the sensors 126 may receive electrical power from a wire that extends to the surface, including wires extending through a wired drillpipe. In at least some examples the methods and techniques of the present disclosure may be performed by a controller 400, for example a computing device, on the surface. The controller 400 is discussed in further detail below in FIG. 4. In some examples, the controller 400 may be included in and/or communicatively coupled with surface receiver 130. For example, surface receiver 130 of wellbore operating environment 100 at the surface may include one or more of wireless telemetry, processor circuitry, or memory facilities, such as to support substantially real-time processing of data received from one or more of the sensors 126. In some examples, data can be processed at some time subsequent to its collection, wherein the data may be stored on the surface at surface receiver 130, stored downhole in telemetry sub 128, or both, until it is retrieved for processing.

The fluid 123 includes a base fluid and one or more additives. For example, as illustrated in FIG. 1, the fluid 123 can include a drilling fluid, also referred to in the field as drilling mud. The drilling fluid may be water based or oil based. In the case of being an oil based fluid, it may be an invert emulsion. The base oil may be natural or synthetic. The drilling fluid may include additives such as weighting agents, viscosifiers, emulsifiers, rheology agents, wetting agents, bridging agents, alkalinity agents, ROP enhancers, anti-accretion additives, corrosion inhibitors, oxygen scavengers, pore pressure transmission reduction additives, shale swelling inhibitors, and/or shale encapsulators. Any of the aforementioned additives or other additives provided to the drilling fluid may be modified to have the marker functional group as disclosed herein. A particular additive for modification to include the marker functional group herein includes shale encapsulators, shale swelling inhibitors or any other suitable additive that may reduce the swelling or dispersion tendency of shales in contact with water, and/or other polymeric additives. Shale encapsulators may bond to clays in shales including cuttings during drilling thereby encapsulating the shale particles and forming a polymeric film around the particle, which may assist in slowing dispersion and disintegration.

The fluid 123 can have a concentration of the additives ranging from about 0.1% to about 10% by weight or by volume. In some examples, the concentration of the additives may range from about 0.1% to about 0.5% by weight or by volume. In some examples, the concentration of the additives may range from about 1.0% to about 3.0% by weight or by volume, for example with shale swelling inhibitors. The additives may have or be modified to have a marker functional group that absorbs infrared radiation having a wavelength in a predetermined range between about 2100 $cm^{-1}$ and about 2300 $cm^{-1}$. The predetermined range between about 2100 $cm^{-1}$ and about 2300 $cm^{-1}$ removes much of the environmental noise, especially in the oil and gas field. For example, petroleum hydrocarbons absorb infrared radiation having a wavelength of about 2950 $cm^{-1}$. As the specific predetermined range between about 2100 $cm^{-1}$ and about 2300 $cm^{-1}$ is relatively empty outside of the absorbances of triple bonded compounds, interferences from other components in the fluid can be reduced. Accordingly, use of the marker functional group as disclosed herein allow for quicker and easier quantification of the additives, allowing for assurance and/or adjustments such that adequate levels of the additives are present in the fluid. For example, if the concentration of the additive is less than a predetermined threshold, then more of the additive can be added into the fluid. In some examples, more than one additive can be quantified. Additional additives may each absorb infrared radiation having a wavelength in additional predetermined ranges between about between about 2100 $cm^{-1}$ and about 2300 $cm^{-1}$. Based on the infrared radiation wavelength that each additive absorbs, each specific additive can be quantified individually.

As the predetermined range between about 2100 cm$^{-1}$ and about 2300 cm$^{-1}$ is desired, the marker functional group may include structure or substituents that give rise to this absorption range, such as a carbon to carbon or carbon to heteroatom triple bond.

The additive can include a base compound or component which may include a main hydrocarbon chain and a marker functional group attached to the main chain. The main chain can be polymeric, and can include, for example, repeating units of a C1 to C10 alkane or C1 to C10 alkene, alternatively a C1 to C3 alkane or C1 to C3 alkene, and may have amide or carboxylic acid or ester or alcohol substituents. In some examples, the additive can include polymers and/or vinyl polymers, and may be formed of homopolymers, terpolymers, branched polymers, star polymers, dendrimers and/or copolymers of acrylamides, acrylates, vinylpyrrolidones, and/or vinyl acetates. In some examples, the additives may be polyethylene glycol, polyethylene glycol polypropylene glycol copolymers, polyolefin polymers, and/or polysaccharides. A particular additive, and which may be used as a particular shale encapsulator, includes acrylamideacrylate polymers. Such polymeric compounds may have high molecular weights (number-average or weight-average) in the range from above about 2 million (M), alternatively from about 2M to about 15M, alternatively from about 3M to about 10M. Alternatively, such shale encapsulators may have low molecular weights below 2M, or alternatively below 1M, or alternatively from 200,000M to 1M, alternatively from 800,000M to 1M. In some examples, the polymeric compounds may have smaller molecular weights, for example in the range of less than 10,000 g/mol. In some examples, the polymeric compounds may have molecular weights of less than 1000 g/mol. For example, the additives may be non-polymeric additives that contain the marker functional groups necessary to absorb infrared radiation in the predetermined range, such as small molecule shale swelling inhibitors.

The marker functional group can be attached as a substituent to the additive main chain or may be embedded within the main chain. In some examples, the marker functional group can include a carbon to carbon triple bond. In some examples, the marker functional group can include a carbon to heteroatom triple bond, wherein the heteroatom is nitrogen. In some examples, the marker functional group can include an alkyne. In some examples, the marker functional group can include a nitrile, such as in acrylonitrile. The triple bond including functional group itself may be straight or branched and may be C1 to C10, alternatively from C1 to C5, alternatively from C1 to C3, alternatively from C1 to C2, and may be substituted further with alkanes, alkenes or aryl.

The marker functional group can be formed in the additive by co-polymerization with the main additive compound. A particular example includes modified shale encapsulators. Shale encapsulators are high molecular weight polymers. A non-limiting example of shale encapsulators may be acrylonitrile co-polymerized with other traditional vinyl monomers to incorporate the marker functional group into the polymer. Modified shale encapsulators can be formed by using conventional shale encapsulators which may be vinyl-based polymers created by radical polymerization, which are then co-polymerized with a marker functional group. For example, acrylonitrile, which may serve as a marker functional group, is a triple-bond-containing vinyl monomer which can be co-polymerized via free radical polymerization with the aforementioned vinyl monomers such as acrylamide, acrylate, vinylpyrrolidone, and/or vinyl acetate, and which may be partially hydrolyzed. As such monomers may be difficult to track, the addition of a marker functional group allows for quantification of the additives.

In some examples, the marker functional group can be formed by a functional group transformation in a molecule to incorporate or partially remove the functional group of interest, such as a triple bond. Accordingly, partial or incomplete compounds may be formed in the preparation of the additives in order to also provide the functional marker group. For example, an amine-based additive may be prepared via the reduction of a nitrile, which may be used as a marker functional group as disclosed herein. A partial or incomplete reduction can be carried out to provide the amine and the nitrile marker functional group as disclosed herein. However, formation of the additive and marker group is not limited and can include any suitable method.

A particular example includes shale swelling inhibitors. Shale swelling inhibitors are small molecules (for example, molecular weight less than 1000 g/mol). Examples of shale swelling inhibitors may be traditional small molecule amine-based inhibitors that could be synthesized by only partial reduction of the nitriles to amines. Conventionally used amine products could also be partially oxidized to convert the amine to a nitrile. In some examples, the nitrile functional group can have some affinity for clay.

While FIG. 1 illustrates a drilling system 100, the sensor 200, as illustrated in FIG. 2, can be utilized in any suitable oil and gas system with fluid such as stimulation, pipeline, and/or production processes. Each of the fluids utilized in the processes include additives to obtain the desired results. For example, in stimulation such as fracturing processes, the fracturing fluid may include proppant additives.

In some examples such as fracturing processes, the additives can include proppants. The proppant particles can include sand, bauxite, ceramic materials, glass materials, polymer materials, polytetrafluoroethylene material, nut shell piece, cured resinous particulate comprising nut shell pieces, seed shell pieces, cured resinous particulate comprising seed shell pieces, fruit pit pieces, cured resinous particulate comprising fruit pit pieces, woods, composite particulates, and/or any other suitable proppant particle. The proppants can include and/or be attached to biocides to suppress bacteria growth, resins or tackifying agents, breakers, and/or cross-linking agents. In other examples, the biocides, resins or tackifying agents, breakers, and/or cross-linking agents can be the additives themselves. The additives can include a marker functional group as discussed herein which absorbs infrared radiation having a wavelength in a predetermined range between about 2100 cm$^{-1}$ and about 2300 cm$^{-1}$.

FIG. 2 illustrates an exemplary sensor 200 to quantify one or more additives in a fluid. The sensor 200 includes a transmitter 210 and a receiver 220. The transmitter 210 includes an emitter 212 which emits infrared radiation 214 that passes through the fluid 204 and is received by the receiver 220. At least some of the infrared radiation 214 is absorbed by components of the fluid 123. The receiver 220 includes one or more filters 222 that can control the wavelengths that are accepted by the receiver 220. In at least one example, the sensor 200 can include an infrared spectrometer.

The fluid 123 can be enclosed in an annulus 204 of a vessel 202. In some examples, the fluid 123 can be a sample taken, for example, from the retention pit 124 as illustrated in FIG. 1. In some examples, the fluid 123 can be a sample taken from a conduit 101, such as a drill string, coiled tubing, and/or a pipe. The vessel 202 can be a cuvette. In at least one example, at least a portion of the walls of the vessel 202 are transparent through which infrared radiation 214 passes through. In some examples, the vessel 202 can be a divergent path from a conduit 101 such as a drill string, coiled tubing, and/or a pipe such that the fluid 123 is not removed from the system 100. In some examples, the vessel 202 can be a portion of the conduit 101 so that the sensor 200 can quantify the additives within the fluid 123 without disturbing the system 100.

At least one of the transmitter 210 and the receiver 220 can be communicatively coupled with a controller 400. The controller 400 can instruct the transmitter 210 to emit infrared radiation 214. Additionally, the controller 400 can receive the measurements from the receiver 220 and determine a concentration of one or more additives in the fluid 123 based on the absorption of infrared radiation by the additive in the predetermined range between about 2100 $cm^{-1}$ and about 2300 $cm^{-1}$.

In some examples, more than one additive can be quantified by the controller 400. Additional additives may each absorb infrared radiation having a wavelength in additional predetermined ranges between about between about 2100 $cm^{-1}$ and about 2300 $cm^{-1}$. Based on the infrared radiation wavelength that each additive absorbs, each specific additive can be quantified individually. In some examples, the sensor 200 may automatically determine the concentration of the additive without human assistance or involvement.

In some examples, the sensor 200 can measure infrared radiation only at the absorbance or absorbances of interest and automatically calculate the additive concentrations based on a built-in calibration curve. In some examples, a known proportion of additive with the marker functional group to the total amount of the additive can be used to calculate the total concentration of the additive in the fluid without the need of every additive requiring the marker functional group.

Figure 3:
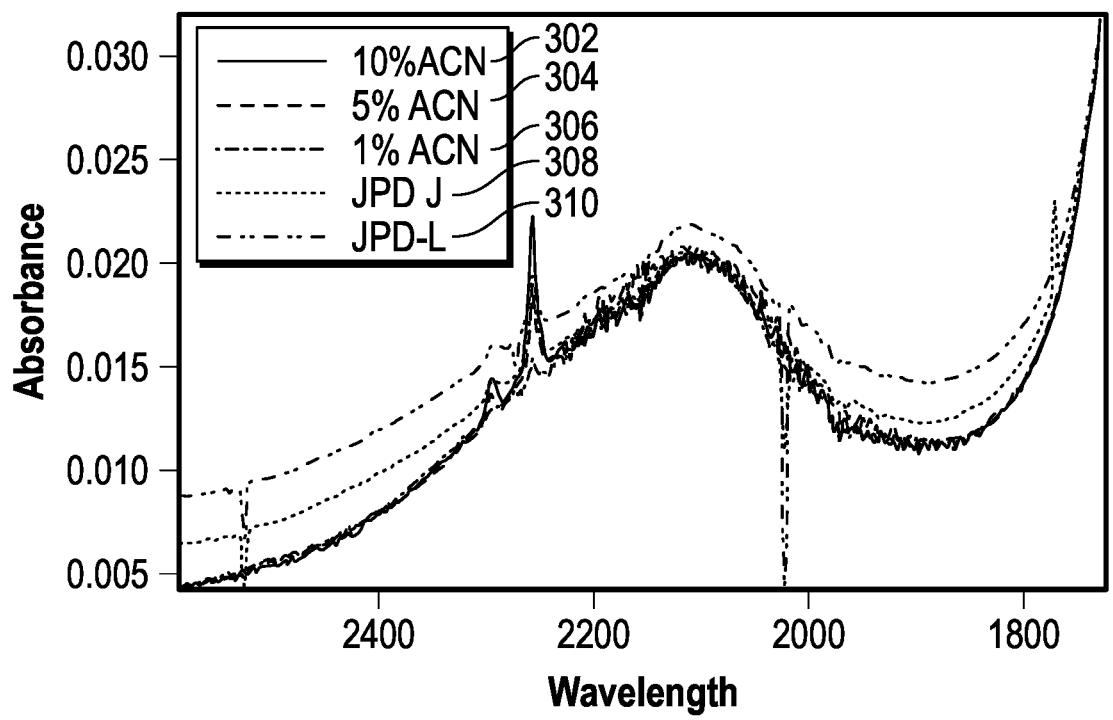
FIG. 3 is a diagram of an example of a graph of absorbance versus wavelength.

In at least one example, the sensor 200 can quantify the additives in the fluid 123 by comparing the measurements with a calibration curve, as illustrated in FIG. 3. In the example illustrated in FIG. 3, the additive being quantified is acetonitrile. For example, acetonitrile can be incorporated into a water-based drilling fluid. The fluid 123 can be mixed and then filtered in an API fluid loss test. The filtrate was examined by infrared spectrometry and compared to reference samples of acetonitrile 302, 304, 306. There are two test readings illustrated in FIG. 3—JPD-J 308 and JPD-L 310. A calibration curve was created using standard solutions 10% acetonitrile 302, 5% acetonitrile 304, and 1% acetonitrile 306 in water. The filtrate shows the presence of the characteristic nitrile stretch of the marker functional group at 2260 $cm^{-1}$ for acetonitrile. Based on the calibration curve, it can be determined that the test reading JPD-J 308 is about 4.6% v/v acetonitrile, and the test reading JPD-L is about 4.4% v/v acetonitrile. Other suitable methods to determine the concentration such as amplitude area can be utilized without deviating from the scope of the disclosure.

As the specific predetermined range between about 2100 $cm^{-1}$ and about 2300 $cm^{-1}$ is relatively empty outside of the absorbances of triple bonded compounds, interferences from other components in the fluid can be reduced. Accordingly, use of the marker functional group as disclosed herein allow for quicker and easier quantification of the additives, allowing for assurance and/or adjustments such that adequate levels of the additives are present in the fluid.

Figure 4:
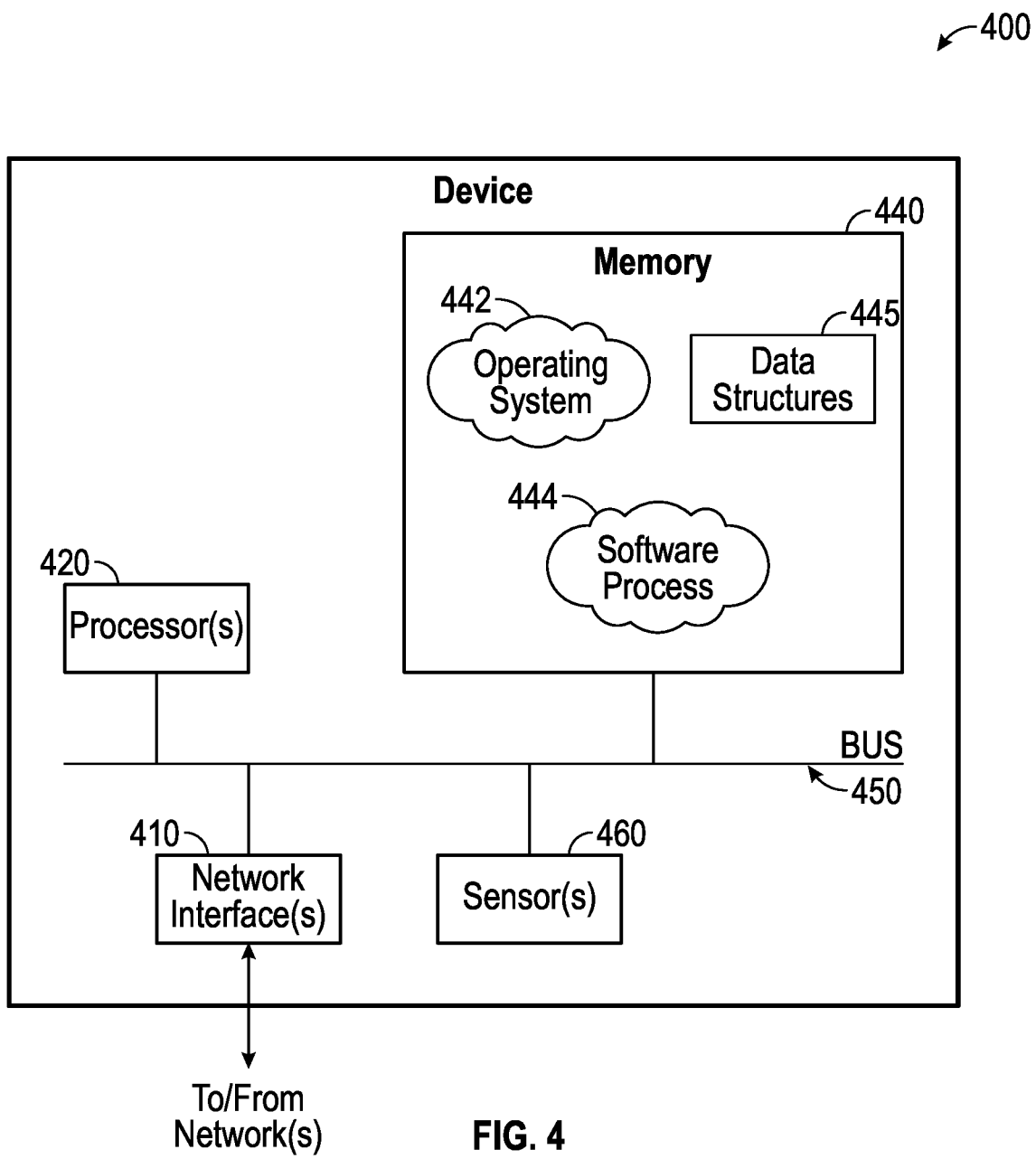
FIG. 4 is a diagram of a controller which may be employed as shown in FIG. 2.

FIG. 4 is a block diagram of an exemplary controller 400. Controller 400 is configured to perform processing of data and communicate with the sensor 200, for example as illustrated in FIG. 2. In operation, controller 400 communicates with one or more of the above-discussed components and may also be configured to communication with remote devices/systems.

As shown, controller 400 includes hardware and software components such as network interfaces 410, at least one processor 420, sensors 460 and a memory 440 interconnected by a system bus 450. Network interface(s) 410 can include mechanical, electrical, and signaling circuitry for communicating data over communication links, which may include wired or wireless communication links. Network interfaces 410 are configured to transmit and/or receive data using a variety of different communication protocols, as will be understood by those skilled in the art.

Processor 420 represents a digital signal processor (e.g., a microprocessor, a microcontroller, or a fixed-logic processor, etc.) configured to execute instructions or logic to perform tasks in a wellbore environment. Processor 420 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 420 typically operates in conjunction with shared or dedicated hardware, including but not limited to, hardware capable of executing software and hardware. For example, processor 420 may include elements or logic adapted to execute software programs and manipulate data structures 445, which may reside in memory 440.

Sensors 460, which may include sensor 200 as disclosed herein, typically operate in conjunction with processor 420 to perform measurements, and can include special-purpose processors, detectors, transmitters, receivers, and the like. In this fashion, sensors 460 may include hardware/software for generating, transmitting, receiving, detection, logging, and/or sampling magnetic fields, seismic activity, acoustic waves, infrared radiation, temperature, pressure, or other parameters.

Memory 440 comprises a plurality of storage locations that are addressable by processor 420 for storing software programs and data structures 445 associated with the embodiments described herein. An operating system 442, portions of which may be typically resident in memory 440 and executed by processor 420, functionally organizes the device by, inter alia, invoking operations in support of software processes and/or services 444 executing on controller 400. These software processes and/or services 444 may perform processing of data and communication with controller 400, as described herein. Note that while process/service 444 is shown in centralized memory 440, some examples provide for these processes/services to be operated in a distributed computing network.

It will be apparent to those skilled in the art that other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 444 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 420 or computer readable medium encoded with instructions for execution by processor 420 that, when executed by the processor, are operable to cause the processor to perform the functions described herein.

Figure 5:
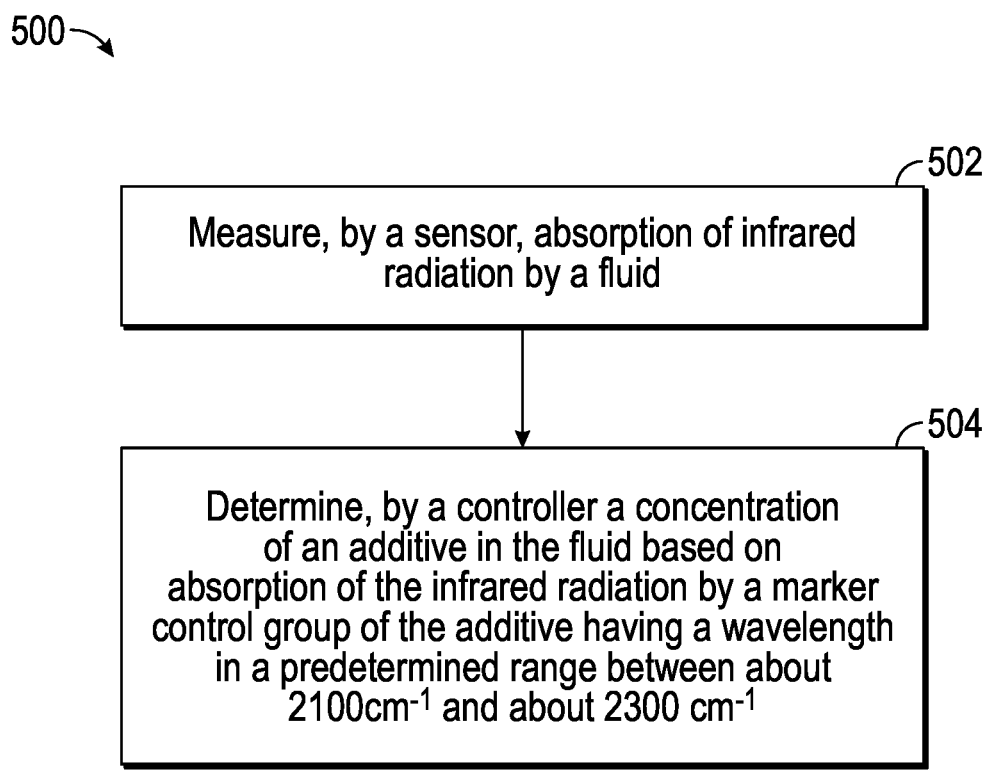
FIG. 5 is a flow chart illustrating an example of a system that may be used in accordance with the present disclosure.

Referring to FIG. 5, a flowchart is presented in accordance with an example embodiment. The method 500 is provided by way of example, as there are a variety of ways to carry out the method. The method 500 described below can be carried out using the configurations illustrated in FIGS. 1-4, for example, and various elements of these figures are referenced in explaining example method 500. Each block shown in FIG. 5 represents one or more processes, methods or subroutines, carried out in the example method 500. Furthermore, the illustrated order of blocks is illustrative only and the order of the blocks can change according to the present disclosure. Additional blocks may be added or fewer blocks may be utilized, without departing from this disclosure. The example method 500 can begin at block 502.

At block 502, a sensor measures absorption of infrared radiation by a fluid. The sensor can emit infrared radiation and receive the infrared radiation after passing through the fluid. In at least one example, the sensor can be an infrared spectrometer. The fluid includes one or more additives which include a marker functional group as disclosed herein. The fluid can be, for example, drilling fluid, fracturing fluid, and/or pipeline fluid. As mentioned, the marker functional group absorbs infrared radiation having a wavelength in a predetermined range between about between about 2100 $cm^{-1}$ and about 2300 $cm^{-1}$.

At block 504, a controller determines a concentration of the additive in the fluid based on absorption of the infrared radiation by the marker functional group of the additive having a wavelength in a predetermined range between about between about 2100 $cm^{-1}$ and about 2300 $cm^{-1}$. In some examples, the controller can determine the concentration of the additive automatically without human assistance.

In at least one example, the controller can determine whether the concentration of the additive is within a predetermined range and/or threshold. In some examples, if the controller determines that the additive is outside of the predetermined range, the controller can adjust the fluid such that the additive is within the predetermined range. For example, if the controller determines that the concentration of inhibitor is less than a predetermined threshold, then more inhibitor can be added. In some examples, the controller can adjust fluid components to inject more inhibitor into the fluid. In some examples, the controller can make adjustments automatically without human interaction and/or assistance. While the above discusses the controller making determinations and taking action, any of the above steps can be performed by a person or people.

As the specific predetermined range between about 2100 $cm^{-1}$ and about 2300 $cm^{-1}$ is relatively empty outside of the absorbances of triple bonded compounds, interferences from other components in the fluid can be reduced. Accordingly, use of the marker functional group as disclosed herein allow for quicker and easier quantification of the additives, allowing for assurance and/or adjustments such that adequate levels of the additives are present in the fluid. For example, if the concentration of the additive is less than a predetermined threshold, then more of the additive can be added into the fluid. In some examples, the controller can control the system to add more additive to the fluid automatically without human assistance. In some examples, the controller can alert a user that more additive is needed such that the user can either add more additive or instruct the controller to adjust the system to add more additive.

Numerous examples are provided herein to enhance understanding of the present disclosure. A specific set of statements are provided as follows.

Statement 1: A wellbore servicing fluid is disclosed comprising: a base fluid; and an additive having a marker functional group that absorbs infrared radiation having a wavelength in a predetermined range between about 2100 $cm^{-1}$ and about 2300 $cm^{-1}$.

Statement 2: A fluid is disclosed according to Statement 1, wherein a concentration of the additive ranges from about 0.1% to about 10% by volume.

Statement 3: A fluid is disclosed according to Statements 1 or 2, wherein the marker functional group comprises a triple bond.

Statement 4: A fluid is disclosed according to any of preceding Statements 1-3, wherein the additive has a main chain comprising repeating units of a substituted or unsubstituted C1 to C10 alkane or C1 to C10 alkene, and the marker functional group has a triple bond.

Statement 5: A fluid is disclosed according to any of preceding Statements 1-4, wherein the additive has a molecular weight of less than 10,000 g/mol.

Statement 6: A fluid is disclosed according to any of preceding Statements 1-5, wherein the marker functional group comprises a carbon to carbon triple bond.

Statement 7: A fluid is disclosed according to any of preceding Statements 1-6, wherein the marker functional group comprises a carbon to heteroatom triple bond.

Statement 8: A fluid is disclosed according to any of preceding Statements 1-7, wherein the marker functional group comprises an alkyne.

Statement 9: A fluid is disclosed according to any of preceding Statements 1-8, wherein the marker functional group comprises a nitrile.

Statement 10: A system is disclosed comprising: a wellbore servicing fluid comprising an additive, the additive having a marker functional group that absorbs infrared radiation having a wavelength in a predetermined range between about 2100 $cm^{-1}$ and about 2300 $cm^{-1}$; and a sensor operable to measure absorption of infrared radiation by the fluid.

Statement 11: A system is disclosed according to Statement 10, further comprising: a controller coupled with the sensor, the controller is operable to determine a concentration of the additive in the fluid based on the absorption of infrared radiation by the additive in the predetermined range.

Statement 12: A system is disclosed according to Statements 10 or 11, wherein the sensor includes an infrared spectrometer.

Statement 13: A system is disclosed according to any of preceding Statements 10-12, wherein the additive has a main chain comprising repeating units of a substituted or unsubstituted C1 to C10 alkane or C1 to C10 alkene, and the marker functional group has a triple bond.

Statement 14: A system is disclosed according to any of preceding Statements 10-13, wherein the additive has a molecular weight of less than 10,000 g/mol.

Statement 15: A system is disclosed according to any of preceding Statements 10-14, wherein the marker functional group comprises a carbon to carbon or carbon to heteroatom triple bond.

Statement 16: A system is disclosed according to any of preceding Statements 10-15, wherein the marker functional group comprises an alkyne.

Statement 17: A system is disclosed according to any of preceding Statements 10-16, wherein the marker functional group comprises a nitrile.

Statement 18: A method is disclosed comprising: measuring, by a sensor, absorption of infrared radiation by a fluid; and determining, by a controller, a concentration of an additive in the fluid based on absorption of the infrared radiation by a marker functional group of the additive having a wavelength in a predetermined range between about 2100 cm$^{-1}$ and about 2300 cm$^{-1}$.

Statement 19: A method is disclosed according to Statement 18, further comprising: determining whether the concentration of the additive is within a predetermined range; and adjusting, when the additive is outside of the predetermined range, the fluid such that the additive is within the predetermined range Statement 20: A method is disclosed according to Statements 18 or 19, wherein the fluid includes one or more additional additives, each of the additional additives absorbing infrared radiation in additional predetermined ranges between about 2100 cm$^{-1}$ and about 2300 cm$^{-1}$, wherein the method further comprises: determining, by the controller, the concentration of each of the additional additives and the additive based on the absorption of infrared radiation by the additive and the additional additives.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A system comprising:
  a wellbore servicing fluid comprising an additive including shale encapsulators or shale swelling inhibitors, the additive having a marker functional group comprising a nitrile that absorbs infrared radiation having a wavelength in a predetermined range between about 2100 cm$^{-1}$ and about 2300 cm$^{-1}$; and
  a sensor operable to measure absorption of infrared radiation by the fluid.

2. The system of claim 1, further comprising:
  a controller coupled with the sensor; the controller is operable to determine a concentration of the additive in the fluid based on the absorption of infrared radiation by the additive in the predetermined range.

3. The system of claim 1, wherein the sensor includes an infrared spectrometer.

4. The system of claim 1, wherein the additive has a main chain comprising repeating units of a substituted or unsubstituted C1 to C10 alkane or C1 to C10 alkene.

5. The system of claim 1, wherein the additive has a molecular weight of less than 10,000 g/mol.

6. The system of claim 1, wherein the wellbore servicing fluid further comprises an additional marker functional group comprising an alkyne.

7. A method comprising:
  measuring, by a sensor, absorption of infrared radiation by a fluid; and
  determining, by a controller, a concentration of an additive including shale encapsulators or shale swelling inhibitors in the fluid based on absorption of the infrared radiation by a marker functional group of the additive comprising a nitrile having a wavelength in a predetermined range between about 2100 cm$^{-1}$ and about 2300 cm$^{-1}$.

8. The method of claim 7, further comprising:
  determining whether the concentration of the additive is within a predetermined range; and
  adjusting, when the additive is outside of the predetermined range, the fluid such that the additive is within the predetermined range.

9. The method of claim 7, wherein the fluid includes one or more additional additives, each of the additional additives absorbing infrared radiation in additional predetermined ranges between about 2100 cm$^{-1}$ to about 2300 cm$^{-1}$, wherein the method further comprises:
  determining, by the controller, the concentration of each of the additional additives and the additive based on the absorption of infrared radiation by the additive and the additional additives.

* * * * *